Patented May 12, 1942

2,282,907

UNITED STATES PATENT OFFICE 2,282,907

PARASITICIDE

William P. ter Horst, Packanack Lake, N. J., assignor to United States Rubber Company, New York, N. Y., a corporation of New Jersey No Drawing. Application May 1, 1941, Serial No. 391,347

13 Claims. (Cl. 167—33)

This invention relates to chemicals found suitable as parasiticides, for example as fungicides, bactericides, insecticides, fumigants, etc.

This application is a continuation-in-part of my application Serial No. 234,955, filed October 14, 1938.

More particularly, the invention relates to the preparations that are prepared to contain the chemicals as essential active constituents, for the purpose of combatting germs, bacteria, fungi, or insects, as well as to materials treated with the chemical for the same purpose. Further, a principal object of the invention is to preserve rubber latices with the aid of said chemicals.

The chemicals are termed "biocides" since they are toxic or repugnant to various living organisms of low orders of life. The chemicals are alpha-aroyl beta-amino-ethanes and subscribe to the general formula

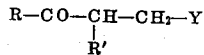

where R is an aryl or a chloro-aryl group; R' is hydrogen or alkyl; and Y is the residue of an amine from the class consisting of primary and secondary amines, said amine residue being joined to the adjacent methylene group through the amine nitrogen atom. Preferably, Y is the residue of a secondary heterocyclic amine. The chemicals may be used as such, or in the form of their salts, particularly their water-soluble salts, for example, the hydrochloride, sulphate, arsenate, borate, salicylate, tannate, thiocyanate, laurate, oleate, etc. The chemicals may be used in the form of sprays or dusts, either alone or in combination with other biocides, or with inert materials, diluents or solvents, or with auxiliary ingredients such as wetting agents, sticking agents, spreading agents, or the like.

The chemicals may be prepared by the well-known Mannich type of reaction, from an alkyl aryl ketone, formaldehyde, and an amine or amine salt; for example, the hydrochloride of alpha-benzoyl beta-piperidino-ethane may be prepared by heating under reflux, during three hours, equimolecular quantities of acetophenone, paraformaldehyde dissolved in water, and piperidine hydrochloride. The free amine (B. P. 139–141° C. at 18 mm. mercury pressure) can be recovered by treatment of the reaction product with caustic alkali. Alpha-benzoyl beta-morpholino-ethane (B. P. 157–163° C. at 23–24 mm. mercury pressure) may be prepared similarly from morpholine hydrochloride. In place of acetophenone, other alkyl aryl ketones having a reactive hydrogen atom on the carbon adjacent to the carbonyl group may be used in the reaction, such a propiophenone or ethyl phenyl ketone, propyl phenyl ketone, p-chloro-acetophenone, and methyl naphthyl ketone. For example, alpha-p-chlorobenzoyl beta-piperidino ethane (melting point 193-194° C.) may be prepared from p-chloroacetophenone, paraformaldehyde, and piperidine hydrochloride.

The amino group at Y in the above formula may correspond to any of the following amines or their salts, after removal of replaceable hydrogen attached to the amine nitrogen atom: dimethylamine, diethylamine, dipropylamine, dibutylamine, diphenylamine, cyclohexylamine, dicyclohexylamine, diamylamine, aniline, dibenzylamine, monobenzylamine, phenetidine, diphenylguanidine, morpholine, diethanolamine, piperidine, pipecoline, etc.

The following examples are given to illustrate the invention:

EXAMPLE 1.—*Fungicidal action.*—Test organism, Macrosporium Sarcinaeforme. Concentration of chemicals, 5 grams per liter of water, in the presence of a small amount of sulfite lye as a wetting agent or of "Wetanol," a commercial wetting agent.

The chemicals were sprayed onto a glass slide, and the sprayed film was dried in air. On each slide then was placed approximately 6,000 spores of the fungus Macrosporium Sarcinaeforme in a drop of water and the spores were permitted to germinate in moist chambers at 25° C. during 12–18 hours. My tests show that at a concentration of 5 grams per liter of water, alpha-benzoyl beta-piperidino-ethane

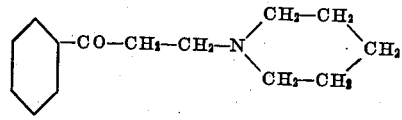

and alpha-benzoyl beta-morpholino-ethane

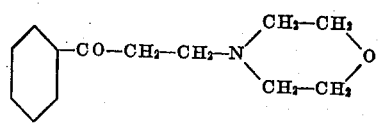

prevented spore germination completely.

EXAMPLE 2.—*Insecticidal action.*—The same two compounds as referred to in Example 1 are toxic towards the Colorado potato beetle when applied in the form of a 10% emulsion in water, causing stupefaction in 45 minutes and death in 2 hours.

EXAMPLE 3.—A solution was prepared, comprising 10% of alpha-benzoyl beta-piperidino-ethane, 1% of Emulphor "EL" (a commercial wetting agent), and 89% of white oil. A water emulsion was made comprising 1 part of the above solution and 100 parts of water. The emulsion was sprayed upon Golden Gleam Nasturtium leaves upon which black bean aphids (Aphis rumicis) had been placed. Out of 478 aphids, 475 died within 24 hours, which is equivalent to a mortality of 99.3%.

Alpha-benzoyl beta-piperidino-ethane is highly toxic to meal worm larvae. The two compounds mentioned in Example 1 may also be used as fumigants. Solutions of these compounds, when applied as mist, have shown great toxicity to black carpet beetle larvae.

Compounds such as

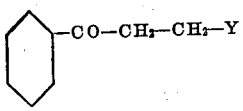

where Y is the residue of a secondary heterocyclic amine joined to the adjacent methylene group through the amine nitrogen atom, or their salts, as illustrated by the chemicals in Example 1, and their hydrochlorides, etc., are especially useful in the preservation of rubber latex, natural as it comes from the tree, or containing well-known alkaline preservatives such as ammonia, sodium or potassium hydroxide, or water-soluble organic derivatives of ammonia, for example basic amines, such as the mono-, di- and trialkyl amines.

The closed nitrogen ring compounds inhibit bacterial growth in the latex, when used in amounts as low as .02% by weight, thereby preventing increase in KOH number due to formation of acidic products of bacterial decomposition. Proportions in excess of .2% by weight are usually unnecessary.

Their use in alkaline-preserved latex permits a reduction in the usual amount of alkaline preservative to amounts as low as .1% in the case of ammonia, and generally in the range of .2 to .75% ammonia. The effectiveness of the chemicals in latex is shown by the following examples:

EXAMPLE 4.—.1% of alpha-benzoyl beta-piperidino-ethane was added to an ammonia latex containing approximately .1% ammonia and having a pH of 8.77. A control sample of latex at the same pH, containing ammonia, was also set up. The control sample became putrid within five days and coagulated within 24 days, while the sample preserved with the alpha-benzoyl beta-piperidino-ethane was sweet and fluid at the end of 60 days.

EXAMPLE 5.—.2% of alpha-benzoyl beta-morpholino-ethane was added to an ammonia latex containing approximately .1% ammonia and having a pH of 8.25; at the same time a control containing no alpha-benzoyl beta-morpholino-ethane was set up. The control was putrid in 24 hours and coagulated in 48 hours, while the sample containing alpha-benzoyl beta-morpholino-ethane was still fluid and sweet at the end of six months.

In both examples 4 and 5, the latex samples had been inoculated with a very powerful strain of latex bacteria.

EXAMPLE 6.—Commercial latex, containing 38.6% solids, and having a KOH number of 1.64, ammonia .38%, and a pH of 9.75, was treated with .1% of the hydrochloride of alpha-benzoyl beta-piperidino-ethane. A control experiment was run at the same time. These latices were inoculated with an infectious strain of latex bacteria.

| | Bacteria per cc. | |
| --- | --- | --- |
| | 6 days | 30 days |
| Control | 1,000,000 | 1,900,000 |
| .1% hydrochloride of alpha-benzoyl beta-piperidino-ethane | 1,000 | 0 |

Similar results are obtained by the use of alpha-p-chlorobenzoyl beta-piperidino ethane or its salts such as the hydrochloride.

It is obvious that various modifications will suggest themselves to persons skilled in the art and it is not desired to limit the invention otherwise than as set forth in the appended claims.

Having thus described my invention, what I claim and desire to protect by Letters Patent is:

1. An insecticide, fungicide and germicide preparation containing as an active constituent, an alpha-aroyl beta-amino-ethane compound selected from the class consisting of chemicals of the formula

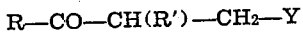

where R is an aryl or chloroaryl group; R' is hydrogen or alkyl; and Y is the residue of an amine from the class consisting of primary and secondary amines, said amine residue being joined to the adjacent methylene group through the amine nitrogen atom, and water-soluble salts of such chemicals.

2. An insecticide, fungicide and germicide preparation containing as an active constituent, an alpha-aroyl beta-amino-ethane compound selected from the class consisting of chemicals of the formula

where R is an aryl or chloroaryl group; and Y is the residue of an amine from the class consisting of primary and secondary amines, said amine residue being joined to the adjacent methylene group through the amine nitrogen atom, and water-soluble salts of such chemicals.

3. An insecticide, fungicide and germicide preparation containing as an active constituent an alpha-benzoyl-beta-piperidino ethane.

4. An insecticide, fungicide and germicide preparation containing as an active constituent an alpha-benzoyl-beta-morpholino-ethane.

5. An insecticide, fungicide and germicide preparation containing as an active constituent an alpha-chlorobenzoyl beta-piperidino ethane.

6. An insecticide, fungicide and germicide preparation containing as an active constituent a product having the general formula

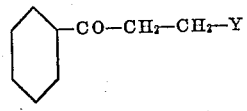

where Y is the residue of an amine from the class consisting of primary and secondary amines, said amine residue being joined to the adjacent methylene group through the amine nitrogen atom.

7. A latex preservative comprising an alpha-aroyl beta-amino-ethane compound selected from the class consisting of chemicals of the formula

where R is an aryl or chloroaryl group, and Y is the residue of a secondary heterocyclic amine joined to the adjacent methylene group through the amine nitrogen atom, and water-soluble salts of such chemicals.

8. Latex containing an alpha-aroyl beta-amino-ethane compound selected from the class consisting of chemicals of the formula

R—CO—CH₂—CH₂—Y where R is an aryl group; and Y is the residue of a secondary heterocyclic amine joined to the adjacent methylene group through the amine nitrogen atom, and water-soluble salts of such chemicals.

9. Alkaline latex containing a bactericide selected from the class consisting of chemicals of the formula

R—CO—CH₂—CH₂—Y where R is an aryl group, and Y is the residue of a secondary heterocyclic amine joined to the adjacent methylene group through the amine nitrogen atom, and water-soluble salts of such chemicals.

10. Latex containing an alpha-benzoyl-beta-piperidino ethane compound.

11. Latex containing an alpha-benzoyl-beta-morpholino ethane compound.

12. Latex containing an alpha-chlorobenzoyl beta-piperidino ethane compound.

13. Latex containing an alpha-aroyl beta-amino-ethane compound selected from the class consisting of chemicals of the formula

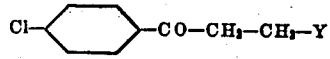

where Y is the residue of a secondary heterocyclic amine joined to the adjacent methylene group through the amine nitrogen atom, and water-soluble salts of such chemicals.

WILLIAM P. ter HORST.